United States Patent [19]

Gupta et al.

[11] Patent Number: 5,554,437
[45] Date of Patent: Sep. 10, 1996

[54] GAMMA-STERILIZABLE BARRIER FABRICS

[75] Inventors: Rakesh K. Gupta, Conyers; Randall E. Kozulla, Social Circle; Richard J. Legare, Conyers, all of Ga.

[73] Assignee: Hercules Incorporated, Wilmington, Del.

[21] Appl. No.: 451,603

[22] Filed: May 26, 1995

Related U.S. Application Data

[63] Continuation of Ser. No. 226,619, Apr. 12, 1994, abandoned, which is a continuation-in-part of Ser. No. 145,360, Oct. 29, 1993, and a continuation-in-part of Ser. No. 47,407, Apr. 19, 1993, abandoned.

[30] Foreign Application Priority Data

Apr. 16, 1993 [GB] United Kingdom .................. 9307117

[51] Int. Cl.$^6$ ............................. B32B 27/00; B32B 5/06; B32B 5/22
[52] U.S. Cl. .......................... 428/286; 428/288; 428/374; 428/297; 428/298; 428/299
[58] Field of Search ..................................... 428/284, 286, 428/288, 373, 374, 297, 298, 299

[56] References Cited

U.S. PATENT DOCUMENTS

| | | |
|---|---|---|
| 3,294,869 | 12/1966 | Robinson . |
| 3,537,969 | 11/1970 | Kelley et al. . |
| 3,616,149 | 10/1971 | Wincklhofer et al. . |
| 3,940,379 | 3/1973 | Hirao . |
| 4,097,943 | 4/1994 | O'Connell . |
| 4,105,381 | 8/1974 | Platt et al. . |
| 4,196,245 | 4/1980 | Kitson et al. ............................ 428/198 |
| 4,282,076 | 3/1980 | Boynton . |
| 4,350,006 | 3/1983 | Okamoto et al. . |
| 4,401,536 | 9/1983 | Lundell et al. . |
| 4,431,497 | 10/1984 | Rekers . |
| 4,501,856 | 11/1988 | Harpell et al. . |
| 4,508,113 | 11/1984 | Malaney . |
| 4,525,257 | 1/1988 | Kurtz et al. . |
| 4,555,813 | 5/1986 | Shimalla . |
| 4,569,736 | 11/1986 | Kuseguki et al. . |
| 4,598,128 | 12/1986 | Randall et al. . |
| 4,623,575 | 12/1986 | Brooks et al. . |
| 4,632,861 | 12/1986 | Vassilatos .............................. 428/296 |
| 4,634,739 | 1/1987 | Vassilatos . |
| 4,657,804 | 3/1988 | Mays et al. . |
| 4,726,976 | 2/1988 | Karami et al. .......................... 428/137 |
| 4,739,025 | 4/1988 | Burch . |
| 4,830,907 | 5/1989 | Sawyer et al. . |
| 4,837,078 | 4/1989 | Harrington . |
| 4,839,228 | 6/1989 | Jezic et al. ............................. 428/401 |
| 4,863,785 | 9/1989 | Berman et al. ......................... 428/218 |
| 4,874,666 | 10/1989 | Kubo et al. . |
| 4,880,691 | 11/1989 | Sawyer et al. . |
| 4,883,707 | 12/1988 | Newkirk . |
| 4,904,520 | 6/1990 | Dumas et al. . |
| 4,909,975 | 3/1990 | Sawyer et al. . |
| 4,931,230 | 3/1987 | Krueger et al. . |
| 4,981,749 | 1/1991 | Kubo et al. ............................. 428/219 |
| 4,990,204 | 2/1991 | Krupp et al. . |
| 5,019,066 | 7/1992 | Freeland et al. . |
| 5,041,491 | 7/1990 | Turke et al. . |
| 5,059,482 | 5/1990 | Kawamoto et al. . |
| 5,108,827 | 4/1992 | Gessner .................................. 428/219 |
| 5,127,593 | 1/1992 | Jennings et al. . |
| 5,133,917 | 7/1992 | Jezic et al. . |
| 5,169,712 | 12/1992 | Tapp ..................................... 428/315.5 |
| 5,173,356 | 12/1972 | Eaton et al. ............................ 428/219 |
| 5,197,936 | 11/1993 | Pagzkin et al. . |
| 5,294,482 | 7/1991 | Gessner . |
| 5,298,694 | 3/1994 | Thompson et al. . |

FOREIGN PATENT DOCUMENTS

| | | |
|---|---|---|
| 260974 | 10/1991 | European Pat. Off. . |
| 522995 | 1/1993 | European Pat. Off. . |
| 277707 | 3/1993 | European Pat. Off. . |
| 0621356 | 10/1994 | European Pat. Off. . |
| 0620294 | 10/1994 | European Pat. Off. . |
| 619393 | 12/1994 | European Pat. Off. . |
| 640329 | 1/1995 | European Pat. Off. . |
| 620294 | 3/1995 | European Pat. Off. . |
| 621356 | 7/1996 | European Pat. Off. . |
| 59-41342 | 3/1984 | Japan . |
| 3279459 | 12/1991 | Japan . |
| 90/10672 | 9/1990 | WIPO . |
| 9515848A1 | 4/1994 | WIPO . |
| 94/17226 | 10/1994 | WIPO . |

OTHER PUBLICATIONS

U.S. Ser. No. 08/145,360, filed Oct. 29, 1993, "Nonwoven Fabric Made From Carded Fine Hydrophobic Polyolefin Fibers & Use for Making Laminates".

U.S. application No. 08/238,324, filed May 5, 1994.

U.S. application No. 08/356,013, filed Dec. 14, 1994 and claiming priority from U.S. Ser. No. 08/046861 filed Apr. 16, 1993.

U.S. application No. 08/046,861, filed Apr. 16, 1993.

English Abstract of Japanese Patent Publication 3-279459.

English Abstract of Japanese Patent Publication 59-41342.

U.S. application No. 08/047,407, filed Apr. 19, 1993.

Japanese Abstract 5124144 May 21, 1993 Abstract Only.

Japanese Abstract 1216820 Aug. 30, 1989 Abstract Only.

Japanese Abstract 1069322 Mar. 15, 1989 Abstract Only.

*Primary Examiner*—James Withers
*Attorney, Agent, or Firm*—Mark D. Kuller; Joanne W. Patterson

[57] ABSTRACT

A gamma-sterilizable barrier fabric comprises (1) at least one layer of a gamma-sterilizable nonwoven material comprising cardable multiconstituent staple fibers, at least 50% by weight of the nonwoven material comprising a gamma-sterilizable polymer, and (2) at least one layer of gamma-sterilizable barrier material selected from film, wet-laid fabrics, and melt-blown webs, at least 50% by weight of the barrier material comprising a gamma-sterilizable polymer.

48 Claims, No Drawings

GAMMA-STERILIZABLE BARRIER FABRICS

This application is a continuation of application Ser. No. 08/226,619, filed Apr. 12, 1994, now abandoned, which is a continuation-in-part of application Ser. No. 08/145,360 filed Oct. 29, 1993, allowed, and application Ser. No. 08/047,407 filed Apr. 19, 1993, abandoned, which was refiled as continuation application Ser. No. 08/395,484, filed Feb. 27, 1995, now U.S. Pat. No. 5,487,943, issued Jan. 30, 1996 both of which are incorporated by reference in their entirety.

FIELD OF THE INVENTION

This invention relates to fabrics comprising a nonwoven material made from cardable staple fibers, and a barrier layer.

BACKGROUND OF THE INVENTION

Composite fabrics are used in a variety of applications such as medical protective garments, surgical drapes, filtration, and house wrap. The composite fabrics used in medical and surgical applications often require sterilization prior to their use. Several sterilization techniques, including gamma radiation, ethylene oxide and steam, are used in the industry. Gamma radiation sterilization is the preferred technique. During exposure to gamma radiation, significant degradation of fabric components can occur, causing the loss of mechanical properties. Therefore, it is desirable that these fabrics are constructed of components that are not significantly affected by the gamma radiation levels used in commercial sterilization processes. These composite fabrics typically comprise at least one fibrous layer to provide textile-like feel and comfort.

Polypropylene fibers are conventionally used for preparing nonwoven fabrics, since polypropylene is capable of thermally bonding over a broad temperature range and polypropylene fiber can be carded into light webs at high speeds. However, exposure to gamma radiation causes considerable deterioration of the mechanical properties of polypropylene. Not only does such deterioration occur immediately after exposure, but the deterioration from that exposure continues over the course of time.

In contrast to polypropylene, polyethylenes generally do not undergo extensive deterioration upon exposure to the dosages of gamma radiation that are employed for sterilizing medical items. Polyethylene fabrics have other favorable attributes, including soft hand, good drape, and heat sealability to polyethylene films. Polyethylene is also widely recognized for its relative chemical inertness in comparison with polyester or nylon fabrics, especially its resistance to acidic or alkaline conditions.

Composite fabrics are described, for example, in U.S. Pat. No. 5,169,712. The preparation of a breathable film based on less than 50% random copolymer of ethylene-propylene, and composite structures containing this film are disclosed. U.S. Pat. No. 5,173,356 describes self-bonded fibrous nonwoven webs and composite products made from these webs. U.S. Pat. No. 4,196,245 discloses a three ply composite made from at least one cover ply, e.g., an apertured polyethylene film, a spunbonded web, or a carded web, and two plies of melt-blown thermoplastic fibers, e.g., polypropylene fibers. U.S. Pat. No. 4,726,976 discloses a composite structure comprising one middle layer of apertured thermoplastic film, e.g., polyethylene film, secured to a top hydrophobic fibrous web and a bottom hydrophilic fibrous web, e.g., nonwoven polypropylene fibrous webs. A composite structure of polyethylene film and polyethylene/polyester sheath/core bicomponent fibers is described in Japanese published patent applications JP 51-24144 and JP 10-69322.

There is still a need for a barrier fabric that is inexpensive to produce, retains its mechanical properties after exposure to gamma radiation, and has a textile-like feel and comfort.

SUMMARY OF THE INVENTION

The fabric of this invention comprises (1) at least one layer of a gamma-sterilizable nonwoven material comprising cardable multiconstituent staple fibers, at least 50% by weight of the nonwoven material comprising a gamma-sterilizable polymer, and (2) at least one layer of gamma-sterilizable barrier material selected from the group consisting of films, wet-laid fabrics, and melt-blown webs, at least 50% by weight of the barrier material comprising a gamma-sterilizable polymer. Other layers may also be present as long as they are gamma-sterilizable.

The barrier fabrics of this invention are drapeable and have a textile-like feel. They substantially retain their mechanical properties after exposure to gamma radiation levels typically used in commercial sterilization processes.

DETAILED DESCRIPTION OF THE INVENTION

The nonwoven material comprising at least one layer of the fabric of this invention comprises cardable multiconstituent staple fibers. Multiconstituent rather than multicomponent fibers, e.g., sheath/core bicomponent fibers, are used because they are significantly less expensive to manufacture. The manufacturing process for making multiconstituent fibers is less complex than the process used for making multicomponent fibers and the throughput rate during manufacturing of the fibers is much higher.

The nonwoven material can comprise all multiconstituent fibers, or it can comprise a mixture of multiconstituent fibers and other cardable staple fibers, as long as at least 50% by weight of the nonwoven material comprises a gamma-sterilizable polymer. Cellulosic fibers such as cotton or rayon fibers are examples of cardable staple fibers that are gamma-sterilizable but are not multiconstituent fibers. More preferably the nonwoven material comprises at least 75% by weight of gamma-sterilizable polymer, and most preferably at least 85% by weight.

Gamma-sterilizable polymers useful in preparing the cardable multiconstituent staple fibers of the nonwoven material include, for example, polyethylene, polyester, and polystyrene. Polyethylene is preferred. The ethylene polymer can be an ethylene homopolymer, or a copolymer of ethylene and up to 20% by weight of another alpha-olefin such as, for example, propylene, butene, octene, and hexene. The ethylene homopolymer can be a low density, high density, or linear low density ethylene polymer. The ethylene 10 polymer fibers typically have a density of about 0.88 to about 0.97 g/cm$^3$.

The multiconstituent fibers can be made from two types of ethylene polymer, e.g., linear low density polyethylene and high density polyethylene, in which case the fibers comprise 100% gamma-sterilizable polymer. When the multiconstituent fiber is not 100% gamma-sterilizable polymer, less than 50% of the fiber can be a non-gamma-sterilizable polymer such as polypropylene, or an ethylene/propylene copolymer comprising more than 20% propylene.

The nonwoven material of this invention comprises one or more nonwoven webs comprising cardable multiconstituent staple fibers. When the material comprises more than one nonwoven web, the carding machines are arranged sequentially and the carded webs from the various machines are deposited on top of each other on a moving belt to form a layered web structure.

The multiconstituent fibers used to make the nonwoven materials of this invention are fibers that are spun from a polymer melt that is a blend of polymers. The multiconstituent fibers can have a hydrophobic or a hydrophilic surface, or a mixture of fibers having hydrophilic and hydrophobic surfaces can be used. Suitable cardable multiconstituent staple fibers include, for example, T-412 and T-413 HIMED™ polyolefin fibers available from Hercules Incorporated, Wilmington, Del., U.S.A.

In a preferred embodiment, the cardable staple multiconstituent fibers have a fiber fineness greater than 1.5 decitex. However, fibers having a fineness less than 1.5 decitex can also be used. Decitex is the weight in grams of 10,000 meters of each fiber. The staple fibers are preferably about 1 to about 6 inches long, more preferably about 1 to about 3 inches, and most preferably about 1¼ to about 2 inches long.

In one embodiment, the multiconstituent fibers comprise polyethylene and either polypropylene or a propylene-ethylene copolymer. Preferably the multiconstituent fibers comprise a dominant continuous linear low density polyethylene phase and at least one discontinuous phase, dispersed through the dominant continuous phase in the form of domains, at least about 70% by weight of the discontinuous phase comprising domains having a diameter of between about 0.05 and about 0.3 microns, the discontinuous phase comprising at least one polymer selected from the group consisting of propylene-ethylene copolymers and polypropylene. The linear low density polyethylene preferably comprises about 55% to about 90% by weight of the fiber, more preferably about 70% to about 90%, and most preferably about 80% to about 90%. These fibers, their preparation and nonwoven materials made from these fibers are disclosed in U.S. application Ser. No. 08/047,407 filed Apr. 19, 1993, which is incorporated by reference in its entirety.

In another embodiment, the multiconstituent fibers comprise at least two polymers, at least one of which is randomly dispersed through the fibers in the form of domains. At least about 40% by weight of the domains have a first dimension of at least about 5% of the equivalent diameter of the fiber, and have a second dimension of at least about 20 microns. Preferably there is a difference of at least 10° C. between the melting points of the two polymers. Most preferably, polypropylene, a polyester, or a copolyester is the higher melting point polymer. Mixtures of a polyester and a copolyester can also be used. A copolyester is a polyester made from more the one polyol component and/or more than one polycarboxylic acid component. Polyethylene, an ethylene-propylene copolymer, or a mixture thereof is preferably used as the lower melting polymer. The fiber preferably comprises at least 50% gamma-sterilizable polymer. These multiconstituent fibers, their preparation, and nonwoven materials made from these fibers are described in U.S. application Ser. No. 08/046,861, filed Apr. 16, 1993, which is incorporated by reference in its entirety.

At least 50% of the barrier material used as one layer of the fabric of this invention is preferably a gamma-sterilizable polymer. Gamma-sterilizable polymers include, for example, polyethylene, polystyrene, polyester, and cellulosic fibers such as cotton, rayon, and wood pulp fibers. Polyethylene is preferred. The ethylene polymer can be an ethylene homopolymer, or a copolymer of ethylene and up to 20% by weight of another alpha-olefin such as, for example, propylene, butene, octene, and hexene. The ethylene homopolymer can be a low density, high density, or linear low density ethylene polymer. The barrier layer can be a film, a wet-laid fabric, or a meltblown web.

When film is used as the barrier layer, it can be either a breathable or nonbreathable film. Breathable films are preferred for most applications. Suitable breathable polyethylene films include, for example, EXXAIRE™ breathable polyethylene films available from Exxon Chemical Company, Lake Zurich, Ill.

Wet-laid nonwoven materials are produced by a process similar to papermaking, i.e., the fibers are laid down on a screen from a slurry of fibers in a liquid. Meltblown nonwovens are produced by heating the polymer to form a melt, extruding the melt through a die orifice in a die head, directing a fluid stream, typically an air stream, toward the polymer melt exiting the die orifice to form filaments or fibers that are discontinuous and attenuated, and depositing the fibers onto a collection surface.

At least one nonwoven material and at least one barrier layer are combined to form the fabric of this invention using techniques such as, for example, thermal calender bonding, ultrasonic bonding, and spot adhesive bonding. The components of the fabric are preferably bonded with a total bond area of less than 50%. The nonwoven material can also be thermally consolidated before it is combined with the barrier layer using any one or a combination of techniques such as, for example, calender thermal bonding, through-air bonding, hydroentangling, needle-punching, ultrasonic bonding, and latex bonding. When the barrier layer is a film, a separate layer of film can be combined with the nonwoven material, or thin layers of film can be extrusion-coated onto the nonwoven material. Other layers, such as a spunbonded layer or another nonwoven material made from cardable fibers, can also be present as long as they are gamma-sterilizable.

Either the nonwoven fabric or the barrier layer, or both, can contain additives commonly used in the art such as, for example, pigments, fillers, stabilizers, and antioxidants.

The fabrics of this invention are liquid-impermeable, and may or may not be permeable to air, depending upon the material used in the barrier layer. If a microporous breathable film is used as the barrier layer, the fabric will also be permeable to air.

The fabrics of this invention are suitable for any medical, hygienic, or related applications where gamma sterilization is needed, e.g., surgical gowns, surgical drapes, and clean room garments. These fabrics are gamma radiation-resistant, i.e., they can endure gamma radiation treatment sufficient to sterilize the fabrics without exhibiting mechanical property deterioration sufficient to render the fabrics unsuitable for their intended use.

The gamma radiation exposure levels used in the sterilization process are measured in Mrad (mega-rad) or Kgy (kilo-Gray). One Mrad equals 10 Kgy. The typical dosage for sterilization purposes is 2 to 6 Mrads. In the following examples, the mechanical properties of the fabrics were measured prior to irradiation and 10 and 27 days after radiation exposure to determine any detrimental aging effects. The mechanical properties were measured on an Instron Corp. tensile tester using 2.54 cm strips of test fabrics with a gauge length of 12.7 cm and a 100% extension rate. The mechanical property values reported in the following tables are the average of three measurements. There is some initial loss of strength and elongation caused by the radiation, the magnitude of the change depending on the radiation dose. After irradiation, fabric properties remain essentially stable with time.

The fabric basis weight is the weight in grams of one square meter of fabric.

The fiber fineness in decitex can be determined either by direct weight measurement or by indirect means such as calculations based on the cross-sectional area of the fiber and the fiber density. A lower decitex (Dtex) value indicates a finer fiber.

Example 1

Thermally bonded nonwoven fabrics were prepared by thermally bonding carded webs of T-412 and T-413 HIMED™ polyolefin staple fibers, available from Hercules Incorporated, Wilmington, Del., U.S.A. The staple fibers are at least 80% linear low density polyethylene and the balance polypropylene and an ethylene-propylene copolymer, and have a fineness of 3.3 decitex. The T-412 fiber has a hydrophilic surface and the T-413 fiber has a hydrophobic surface. The nonwoven fabric of sample A, comprised of T-412 HIMED™ polyolefin staple fibers, was prepared using three sequentially arranged carding machines. The three carded webs were combined and calender thermal bonded. The line speed was 30 meters per minute and the temperature of both the top engraved and the bottom smooth calender rolls was 138° C. The nonwoven fabric of sample B, comprised of T-413 HIMED™ polyolefin staple fibers, was prepared using four sequentially arranged carding machines. The four carded webs were combined and calender thermal bonded. The line speed was 30 meters per minute and the temperatures of the top engraved and the bottom smooth calender rolls were 148° C. and 143° C. respectively. The nonwoven fabric basis weights are shown in Table 1. These fabrics were combined with EXXAIRE™ breathable polyethylene film designated NIPBC-A #3, available from Exxon Chemical Company, Lake Zurich, Ill., at 48 meters per minute. The Porous Coat™ process, available from Nordson Corporation, Norcross, Ga., was used to bond the nonwoven fabric to the film using a hot melt adhesive designated as 2316-01, available from Findley Adhesive, Inc., Wauwatosa, Wis. The amount of adhesive used is also shown in Table 1. The mechanical properties of the laminates were measured before irradiation and are shown in Table 1.

In the following tables, MDT is machine direction tensile strength, MDE is machine direction elongation, CDT is cross direction tensile strength, and CDE is cross direction elongation.

TABLE 1

| | | Laminate Properties before Gamma Irradiation | | | | | | |
|---|---|---|---|---|---|---|---|---|
| | | Nonwoven Fabric | Film | Adhesive | Mechanical Properties | | | |
| Sample | Fiber Type | Weight g/m² | Weight g/m² | Weight g/m² | MDT (g) | MDE % | CDT (g) | CDE % |
| A | T-412 | 23 | 17 | 12 | 1825 | 62 | 1985 | 83 |
| B | T-413 | 27 | 19 | 12 | 2830 | 24 | 1610 | 122 |

Fabric samples were then exposed to gamma radiation at a radiation dose of 30 and 60 Kgy. Tensile mechanical properties of these laminates were measured after gamma irradiation. The data are presented in Tables 2 and 3. Table 2 shows properties measured 10 days after irradiation. Table 3 shows comparable data measured 27 days after irradiation. There is little or no accelerated aging after irradiation of these composite fabrics.

TABLE 2

| | | Laminate Properties 10 Days After Gamma Irradiation | | | |
|---|---|---|---|---|---|
| | | 30 Kgy Grab Mechanical Properties | | 60 Kgy Grab Mechanical Properties | |
| Sample | Fiber Type | MDT (g) | MDE % | MDT (g) | MDE % |
| A | T-412 | 1550 | 40 | 1390 | 30 |
| B | T-413 | 2210 | 16 | 1755 | 12 |

TABLE 3

| | | Laminate Properties 27 Days After Gamma Irradiation | | | |
|---|---|---|---|---|---|
| | | 30 Kgy Grab Mechanical Properties | | 60 Kgy Grab Mechanical Properties | |
| Sample | Fiber Type | MDT (g) | MDE % | MDT (g) | MDE % |
| A | T-412 | 1410 | 35 | 1375 | 33 |
| B | T-413 | 2150 | 16 | 1800 | 13 |

It is not intended that the examples given here should be construed to limit the invention, but rather they are submitted to illustrate some of the specific embodiments of the invention. Various modifications and variations of the present invention can be made without departing from the scope of the appended claims.

We claim:

1. A fabric comprising (1) at least one layer of a gamma-sterilizable nonwoven material comprising cardable multiconstituent staple fibers, at least 50% by weight of the nonwoven material comprising a gamma-sterilizable polymer and more than 50% by weight of the multiconstituent staple fiber comprising the gamma-sterilizable polymer, and (2) at least one layer of gamma-sterilizable barrier material selected from the group consisting of film, wet-laid fabrics, and meltblown webs, at least 50% by weight of the barrier material comprising a gamma-sterilizable polymer.

2. The fabric of claim 1 wherein the amount of gamma-sterilizable polymer in the nonwoven material is at least 75% by weight.

3. The fabric of claim 2, wherein the amount of gamma-sterilizable polymer in the nonwoven material is at least 85% by weight.

4. The fabric of claim 1, wherein the gamma-sterilizable polymer in the nonwoven material is an ethylene polymer.

5. The fabric of claim 4, wherein the ethylene polymer is linear low density polyethylene.

6. The fabric of claim 1, wherein the gamma-sterilizable polymer in the barrier material is an ethylene polymer.

7. The fabric of claim 4, wherein the gamma-sterilizable polymer in the barrier material is an ethylene polymer.

8. The fabric of claim 1, wherein the barrier material is a film.

9. The fabric of claim 8, wherein the film is a breathable film comprising at least 50% by weight of ethylene polymer.

10. The fabric of claim 4, wherein the barrier layer is a breathable film comprising at least 50% by weight of an ethylene polymer.

11. The fabric of claim 1, wherein the nonwoven material is thermally consolidated.

12. The fabric of claim 1, wherein the cardable staple fibers have a fiber fineness greater than 1.5 decitex.

13. The fabric of claim 1, wherein the nonwoven material comprises at least 85% by weight of an ethylene polymer, the nonwoven material is thermally consolidated, and the barrier material is a breathable film comprising at least 50% by weight of an ethylene polymer.

14. The fabric of claim 1, wherein the cardable multiconstituent staple fibers comprise a continuous polyethylene phase and a discontinuous phase is selected from the group consisting of a propylene-ethylene copolymer, polypropylene, and mixtures thereof.

15. The fabric of claim 14, wherein the cardable multiconstituent staple fibers comprise a dominant continuous linear low density polyethylene phase and at least one discontinuous phase dispersed through the dominant continuous phase in the form of domains, at least about 70% by weight of the discontinuous phase comprising domains having a diameter of between about 0.05 and about 0.3 microns, the discontinuous phase comprising at least one polymer selected from the group consisting of propylene-ethylene copolymers and polypropylene.

16. The fabric of claim 1, wherein the multiconstituent fiber comprises a first polymer and second polymer, at least one of the polymers being randomly dispersed through the fiber in the form of domains, wherein, for each polymer randomly dispersed in the form of domains, at least about 40 percent by weight of the domains have a first dimension of at least about 5 percent of the equivalent diameter of the fiber, and have a second dimension of at least about 20 microns.

17. The fabric of claim 16, wherein the first polymer is a higher melting polymer and the second polymer is a lower melting polymer, and the melting point of the first polymer is at least about 10° C. higher than the melting point of the second polymer.

18. The fabric of claim 17, wherein the higher melting polymer is polypropylene, and the lower melting polymer is selected from the group consisting of polyethylene, an ethylene-propylene copolymer, and mixtures thereof.

19. The fabric of claim 17, wherein the higher melting polymer is selected from the group consisting of a polyester, a copolyester, and mixtures thereof, and the lower melting polymer is selected from the group consisting of polyethylene, an ethylene-propylene copolymer, and mixtures thereof.

20. The fabric of claim 1 wherein the amount of gamma-sterilizable polymer in the multiconstituent staple fiber is at least 75% by weight.

21. The fabric of claim 1 wherein the amount of gamma-sterilizable polymer in the multiconstituent staple fiber is at least 85% by weight.

22. The fabric of claim 1 wherein the amount of gamma-sterilizable polymer in the multiconstituent staple fiber is about 55 to about 90% by weight.

23. The fabric of claim 1 wherein the amount of gamma-sterilizable polymer in the multiconstituent staple fiber is at least about 70 to about 90% by weight.

24. The fabric of claim 1 wherein the amount of gamma-sterilizable polymer in the multiconstituent staple fiber is at least about 80 to about 90% by weight.

25. The fabric of claim 20, wherein the gamma-sterilizable polymer in the multiconstituent staple fiber is linear low density polyethylene.

26. The fabric of claim 21, wherein the multiconstituent fiber is a biconstituent fiber and the gamma-sterilizable polymer in the multiconstituent staple fiber is linear low density polyethylene.

27. The fabric of claim 22, wherein the gamma-sterilizable polymer in the multiconstituent staple fiber is an ethylene polymer.

28. The fabric of claim 27, wherein the ethylene polymer is linear low density polyethylene.

29. The fabric of claim 22, wherein the gamma-sterilizable polymer in the barrier material is an ethylene polymer.

30. The fabric of claim 23, wherein the gamma-sterilizable polymer in the barrier material is an ethylene polymer.

31. The fabric of claim 23, wherein the barrier material is a breathable film comprising at least 50% by weight of ethylene polymer.

32. The fabric of claim 20, wherein the cardable staple fibers have a fiber fineness greater than 1.5 decitex.

33. The fabric of claim 20, wherein the cardable multiconstituent staple fibers comprise a continuous polyethylene phase and the discontinuous phase is selected from the group consisting of a propylene-ethylene copolymer, polypropylene, and mixtures thereof.

34. The fabric of claim 22, wherein the cardable multiconstituent staple fibers comprise a continuous polyethylene phase and the discontinuous phase is selected from the group consisting of a propylene-ethylene copolymer, polypropylene, and mixtures thereof.

35. The fabric of claim 22, wherein the cardable multiconstituent staple fibers comprise a continuous linear low density polyethylene phase and the discontinuous phase is selected from the group consisting of a propylene-ethylene copolymer, polypropylene, and mixtures thereof.

36. The fabric of claim 22, wherein the cardable multiconstituent staple fibers comprise a dominant continuous linear low density polyethylene phase and at least one discontinuous phase dispersed through the dominant continuous phase in the form of domains, at least about 70% by weight of the discontinuous phase comprising domains having a diameter of between about 0.05 and about 0.3 microns, the discontinuous phase comprising at least one polymer selected from the group consisting of propylene-ethylene copolymers and polypropylene.

37. The fabric of claim 22, wherein the multiconstituent fiber comprises a first polymer and a second polymer, at least one of the polymers being randomly dispersed through the fiber in the form of domains, wherein, for each polymer randomly dispersed in the form of domains, at least about 40 percent by weight of the domains have a first dimension of at least about 5 percent of the equivalent diameter of the fiber, and have a second dimension of at least about 20 microns.

38. The fabric of claim 22, wherein the first polymer is a higher melting polymer and the second polymer is a lower melting polymer, and the melting point of the first polymer is at least about 10° C. higher than the melting point of the second polymer.

39. The fabric of claim 38, wherein the higher melting polymer is polypropylene, and the lower melting polymer is selected from the group consisting of polyethylene, an ethylene-propylene copolymer, and mixtures thereof.

40. The fabric of claim 38, wherein the higher melting polymer is selected from the group consisting of a polyester, a copolyester, and mixtures thereof, and the lower melting polymer is selected from the group consisting of polyethylene, an ethylene-propylene copolymer, and mixtures thereof.

41. The fabric of claim 1 wherein the gamma-sterilizable polymer of the multiconstituent staple fiber is selected from the group consisting of polyethylene, polyester, and polystyrene.

42. The fabric of claim 1 wherein the gamma-sterilizable polymer of the barrier material is selected from the group consisting of polyethylene, polystyrene, polyester, and cellulosic fibers selected from the group consisting of cotton, rayon and wood pulp fibers.

43. The fabric of claim 41 wherein the gamma-sterilizable polymer of the barrier material is selected from the group consisting of polyethylene, polystyrene, polyester, and cellulosic fibers selected from the group consisting of cotton, rayon and wood pulp fibers.

44. The fabric of claim 41 wherein the fiber is a biconstituent fiber.

45. The fabric of claim 44, wherein the biconstituent fiber comprises a continuous phase of the gamma-sterilizable polymer and a discontinuous phase selected from the group consisting of a propylene-ethylene copolymer, polypropylene, and mixtures thereof.

46. A fabric as claimed in claim 1 wherein the multiconstituent fiber has a fineness less than 1.5 decitex.

47. A fabric as claimed in claim 1 wherein the multiconstituent staple fiber has a length of about 1 to about 3 inches.

48. A fabric comprising (1) at least one layer of a gamma-sterilizable nonwoven material comprising multiconstituent fibers, at least 50% by weight of the nonwoven material comprising a gamma-sterilizable polymer and more than 50% by weight of the multiconstituent staple fiber comprising the gamma-sterilizable polymer, and (2) at least one layer of gamma-sterilizable barrier material selected from the group consisting of film, wet-laid fabrics, and meltblown webs, at least 50% by weight of the barrier material comprising a gamma-sterilizable polymer.

* * * * *

UNITED STATES PATENT AND TRADEMARK OFFICE
CERTIFICATE OF CORRECTION

PATENT NO. : 5,554,437
DATED : September 10, 1996
INVENTOR(S) : Rakesh K. Gupta, Randall E. Kozulla & Richard J. Legare It is certified that error appears in the above-indentified patent and that said Letters Patent is hereby corrected as shown below:

1. Claim 16, column 7, line 45, insert --a-- before "second".

Signed and Sealed this

Twenty-fifth Day of February, 1997

Attest:

BRUCE LEHMAN

*Attesting Officer*  *Commissioner of Patents and Trademarks*